T867010

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED OCTOBER 21, 1969

867 O.G. 749

819,977

PROCESS FOR PREPARATION OF ACICULAR γ-IRON(III) OXIDE

Donald Pearlman and Richard William Stahr, both % Kodak Park Works, Rochester, N.Y. 14650

Filed Apr. 28, 1969. Published Oct. 21, 1969

Int. Cl. C01g *49/06*

U.S. Cl. 23—200

No Drawing. 11 Pages Specification

Fine, acicular, crystalline particles of essentially α-iron(III) oxide hydrate are prepared by (1) mixing together (A) an aqueous alkaline solution (e.g. sodium hydroxide solution) and (B) an aqueous solution of an iron(III) salt (e.g. ferric chloride) together with a relatively small percentage of an iron(II) salt (e.g. ferrous chloride), to form a precipitate; and (2) thereafter heating the precipitate under pressure to transform it into said particles. The reaction should be carried out at a pH between 11 and 12, preferably between 11.5 and 11.9, and the ratio of gram-atoms of iron(II) salt to gram-atoms of iron(III) salt should be at least about $10^{-4}$ but not greater than about $10^{-1}$. Alternatively, similar results may be obtained by including a small quantity of an anionic surfactant (e.g. sodium alkyl napthalene sulfonate) in solution B in place of the iron(II) salt. The α-iron(III) oxide hydrate particles resulting from either of these reactions are especially useful for conversion, by the known additional successive steps of dehydration, reduction to $Fe_3O_4$ and final oxidation, to magnetic γ-iron(III) oxide particles for use in magnetic record members.